L. Scharff,
Tile Machine.
Nº 45,084. Patented Nov. 15, 1864.

Witnesses.
H. Albert Steel
Charles Howson.

Inventor.
H. Howson
(per C. E. Foster)
Atty. for Louis Scharff.

UNITED STATES PATENT OFFICE.

LOUIS SCHARFF, OF CONSHOHOCKEN, PENNSYLVANIA.

FORMING SOCKETS ON TERRA-COTTA PIPES.

Specification forming part of Letters Patent No. 45,084, dated November 15, 1864.

*To all whom it may concern:*

Be it known that I, LOUIS SCHARFF, of Conshohocken, Montgomery county, Pennsylvania, have invented a Mode of Forming Sockets on Terra-Cotta Pipes; and I do hereby declare the following to be a full, clear, and exact description of the same, reference being had to the accompanying drawings, and to the letters of reference marked thereon.

My invention consists in forming sockets on terra-cotta pipes by the aid of a block and a former, substantially in the manner fully described hereinafter, in order that the terra-cotta of which the socket is formed may be thoroughly incorporated with and be an integral part of the body of the pipe, thereby preventing the sockets from being broken off—a common occurrence when they are formed in the usual manner.

In order to enable others skilled in the art to practice my invention, I will now proceed to describe the manner of carrying it into effect.

Figure 1:
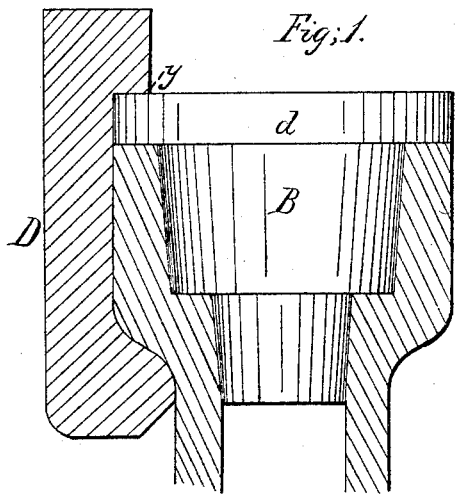
Figure 3:
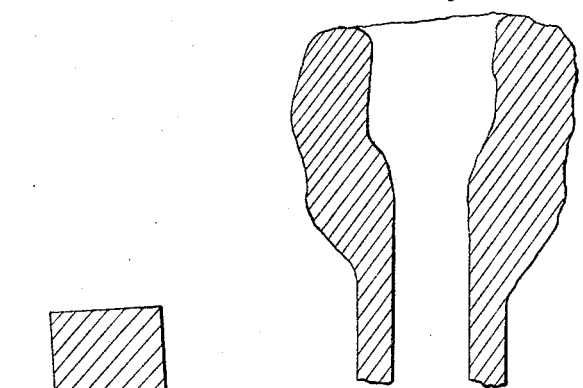
Figure 2:
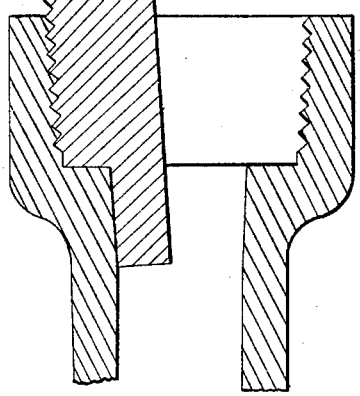

On reference to the accompanying drawings, which form a part of this specification, Figure 1 is a vertical section of one end of a terra-cotta pipe, showing my improved mode of forming the socket; Fig. 2, a view showing the manner of forming the interior of the socket. Fig. 3 illustrates the end of the pipe in its crude state prior to having the proper form imparted to it.

Prior to describing my invention, it may be well to allude to the ordinary mode of forming sockets on the ends of terra-cotta pipes. It has been usual heretofore to form the socket in a mold separate from the body of the pipe, and to fasten the two together while in a plastic state. The objection to this mode is the insecurity of the joint when the pipe is baked, the socket being very apt to be broken at the point where the juncture is made—an evil which my invention has been designed to obviate.

The tubular bodies of terra cotta pipes are made in the same manner as tubes are formed—namely, by forcing the clay through annular openings in plates.

In practicing my invention, the operator takes a terra-cotta tube of the desired length, and, while still in a plastic state, places it in a vertical position, its lower end resting on a horizontal disk, to which a rotary motion can be imparted by the feet of the operator or by other power. The attendant then attaches to the upper end of the tube a mass of terra-cotta in a plastic state, and of more than sufficient bulk to form the desired socket, the mass being thoroughly incorporated with the tube by kneading. While the pipe (which remains in a vertical position) is turned with the disk on which it rests, the operator with his hands forms the top to a shape approximating to that of the desired socket. He then places within the partially-formed socket a circular block, B, which may be made of wood, plaster-of-paris, or both combined. This block determines the form of the interior of the socket, as plainly illustrated in Fig. 1.

As the flange $a$ of the block rests on and forms the upper edge of the socket, the block must determine the depth as well as the diameter of the interior of the socket.

While the block remains in its place, and while the pipe continues to revolve, the operator applies the former D to the exterior of the socket, the shoulder $y$ resting on the top of the block B. As the pipe continues to revolve, the superfluous clay will be removed by this former, which will determine the shape and dimensions of the exterior of the socket. The operator now lays aside the former D and withdraws the block B, and, while the pipe continues to revolve, applies to the interior of the socket another former, E, the edge of which is notched, so as to form within the interior of the socket the annular indentations required in pipes of this class.

I claim as my invention and desire to secure by Letters Patent—

Forming sockets on terra-cotta pipes by the aid of the block B and former D, substantially in the manner and for the purpose described.

In testimony whereof I have signed my name to this specification in the presence of two subscribing witnesses.

LOUIS SCHARFF.

Witnesses:
JOHN WHITE,
CHARLES HOWSON.